(12) United States Patent
Quintana et al.

(10) Patent No.: US 6,877,170 B1
(45) Date of Patent: Apr. 12, 2005

(54) TOILET CONTROL SYSTEM

(75) Inventors: Richard Quintana, Westminster, CA (US); Devon Niccole, Huntington Beach, CA (US)

(73) Assignee: Niccole Family Trust, Huntington Beach, CA (US)

( * ) Notice: Subject to any disclaimer, the term of this patent is extended or adjusted under 35 U.S.C. 154(b) by 9 days.

(21) Appl. No.: 10/624,008

(22) Filed: Jul. 21, 2003

(51) Int. Cl.[7] .......................... E03D 11/02; E03D 1/00
(52) U.S. Cl. ................. 4/427; 4/313; 4/353; 4/406; 137/392; 137/312
(58) Field of Search ........................ 4/427, 367, 313, 4/353, 378, 417, 406, 314, 415; 137/392, 391, 312, 412, 413; 702/51, 55; 700/281, 282; 340/605, 616, 623; 73/305, 306

(56) References Cited

U.S. PATENT DOCUMENTS

| | | | | |
|---|---|---|---|---|
| 4,352,025 A | * | 9/1982 | Troyen | 290/54 |
| 4,790,036 A | * | 12/1988 | Vogeli et al. | 4/233 |
| 5,133,089 A | * | 7/1992 | Tsutsui et al. | 4/300 |
| 5,363,513 A | * | 11/1994 | Blankenburg | 4/354 |
| 5,731,758 A | | 3/1998 | Suttlemeyer et al. | 340/612 |
| 5,940,899 A | * | 8/1999 | Mankin et al. | 4/427 |
| 6,058,519 A | | 5/2000 | Quintana | 4/427 |
| 6,061,843 A | * | 5/2000 | Rump et al. | 4/302 |
| 6,178,569 B1 | | 1/2001 | Quintana | 4/427 |
| 6,367,096 B1 | | 4/2002 | Quintana | 4/427 |
| 6,536,053 B2 | * | 3/2003 | Icking et al. | 4/367 |

* cited by examiner

Primary Examiner—Gregory L. Huson
Assistant Examiner—Khoa Huynh
(74) Attorney, Agent, or Firm—James G O'Neill; Klein, O'Neill & Singh, LLP

(57) ABSTRACT

A toilet water measuring and flow control system, including leak and overflow detection and prevention elements. The system has inlet and outlet flow sensors operably connected to inlet and outlet control valves and to water level sensors to measure and control water flow to and from the toilet. Water level sensors held in a toilet tank are connected to the system to control the volume of water fed to the toilet tank and passing through the outlet. The toilet tank may be provided with a movable reservoir to more accurately control the amount of water held in the tank and exiting the tank upon flushing.

20 Claims, 3 Drawing Sheets

TOILET CONTROL SYSTEM

BACKGROUND OF THE INVENTION

1. Field of the Invention

This invention relates generally to fluid control systems, and more particularly, to a control system built-into or placed in a toilet for measuring and controlling flow of water into and out of the toilet, as well as detecting and preventing unwanted leakage and/or overflow of water from the toilet.

2. Description of Related Art

As homeowners, apartment dwellers and those who work in and around certain types of institutions, such as convalescent homes, hotels, motels, retirement homes, and the like, are aware, toilet bowls may become blocked for any number of reasons, and/or a person might repeatedly flush such a toilet to cause it to flood. This flooding may cause serious problems, particularly at hotels or motels and in institutions, such as homes for the aged, since a person may slip and fall, or be subjected to diseases by such flooding waters. Furthermore, with water conservation becoming increasingly more important, the need to control the amount of water used in a toilet and the detecting and prevention of water leaks and overflows in toilets, has become an increasingly urgent necessity.

Many patents have disclosed mechanical and electrically controlled water overflow devices to prevent overflows in toilets. An example of such patents includes U.S. Pat. Nos. 6,058,509 and 6,178,569 in the name of Richard Quintana, one of the inventors named herein. Additionally, U.S. Pat. No. 6,367,096 940,899 to Richard Quintana discloses a system that detects water leaks and shuts off the flow of water to a toilet bowl by means of a sensor mounted to the toilet bowl at a location above a normal water level. However, the devices disclosed in these patents fail to disclose or teach a water flow measurement and control system having a plurality of water level and leak sensors, placed in or formed integrally with a toilet, of the type specifically disclosed herein.

The present invention overcomes known problems with existing devices and saves large amounts of water by incorporating a system into a toilet for measuring and controlling flow of water to and from the toilet, as well as effectively and conveniently detecting and preventing leaks and overflows form the toilet.

SUMMARY OF THE INVENTION

Accordingly, it is a general object of the present invention to provide an improved and simplified fluid flow control system. It is a particular object of the present invention to provide an improved and simplified water flow control and leak detection system for a toilet. It is still another particular object of the present invention to provide an improved and simplified system for measuring and controlling water flow to a toilet, as well as detection and prevention of leaks and overflows from the toilet. It is a further particular object of the present invention to provide an improved and simplified built-in microprocessor activated water flow control and leak prevention system for a toilet, which system is operatively connected to a plurality of flow control and water level sensors having charging means. It is a still further particular object of the present invention to provide an improved and simplified system for measuring and controlling water flow to a toilet, as well as the detection and prevention of leaks and overflows by means of a microprocessor operatively connected to inlet and outlet control valves, one or more flow sensors and a number of water level control sensors. It is yet another particular object of the present invention to provide an improved and simplified system for measuring and controlling water flow to a toilet, as well as detection and prevention of leaks and overflows, including a movable reservoir, held in a toilet tank, for receiving and distributing a measured amount of water.

These and other objects and advantages of the present invention are achieved by providing a water measuring and flow control system having leak and overflow detection and prevention functions in a toilet. The system has inlet and outlet flow sensors operatively connected to inlet and outlet control valves and to a plurality of water level sensors to measure and control water flow to and from the toilet. A number of water level sensors are held in a toilet tank and are operatively connected to at least the inlet valve to control the volume of water fed to the toilet tank and passing through the outlet. The system may also include a movable reservoir held in the toilet tank for receiving a predetermined amount of water and dispensing the predetermined amount of water upon operation of the toilet flushing mechanism.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved and simplified water measuring and flow control system having leak and overflow detection and prevention capabilities for a toilet, generally indicated at 10.

The present invention may be used in any type of toilet and utilizes currently available technology to provide an improved toilet control system, generally indicated at 12, that operates more efficiently and quietly to more accurately measure and control the amount of water that flows to and from a toilet and which detects and prevents leakage and overflows, thereby conserving water. Additionally, the system 12 may be adapted to fit into any currently available toilet or may be built into or incorporated in newly manufactured toilets. The system 12 is adapted to be used with any type of power system and may include means to charge the power system.

Figure 1:
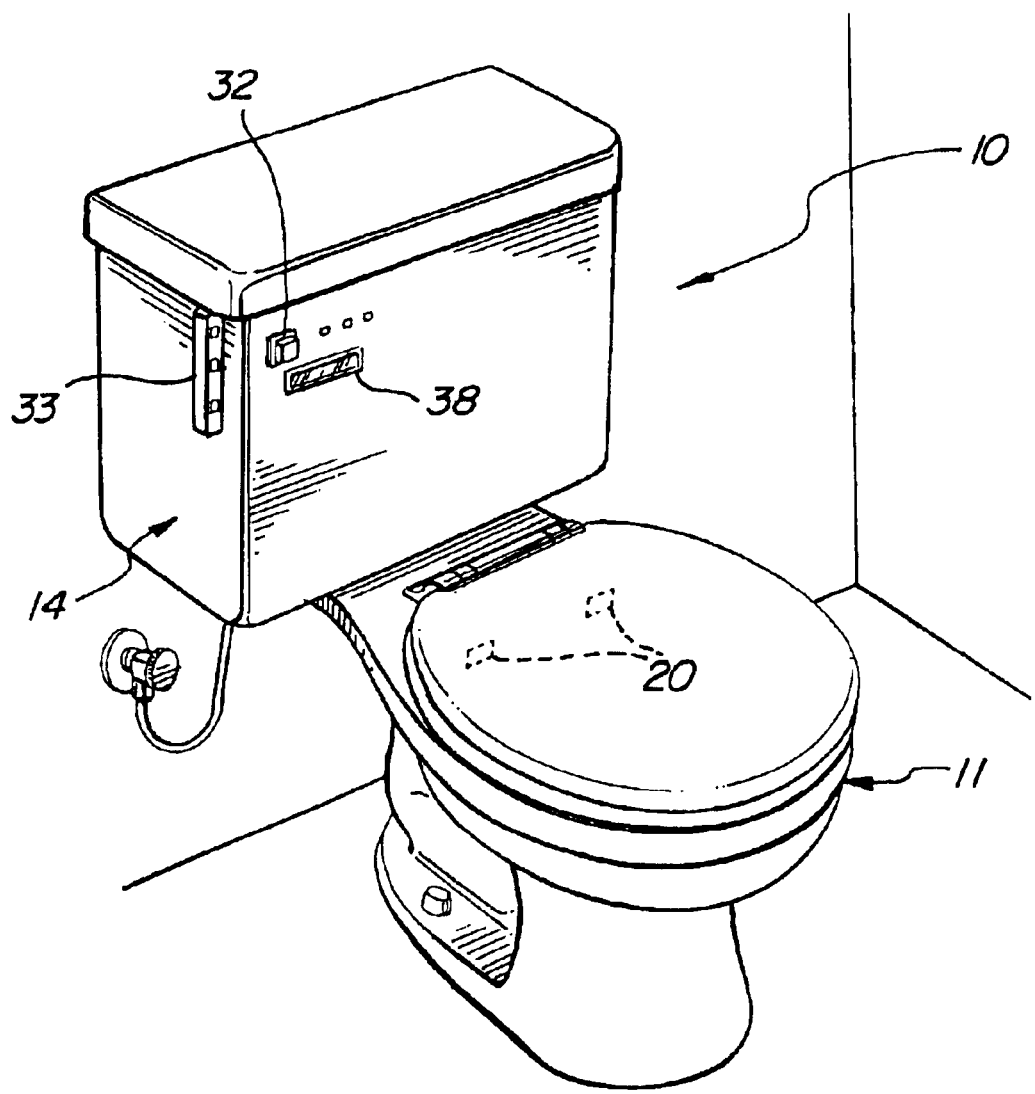
FIG. 1 is a front perspective view of a toilet having the system of the present invention held therein.
Figure 2:
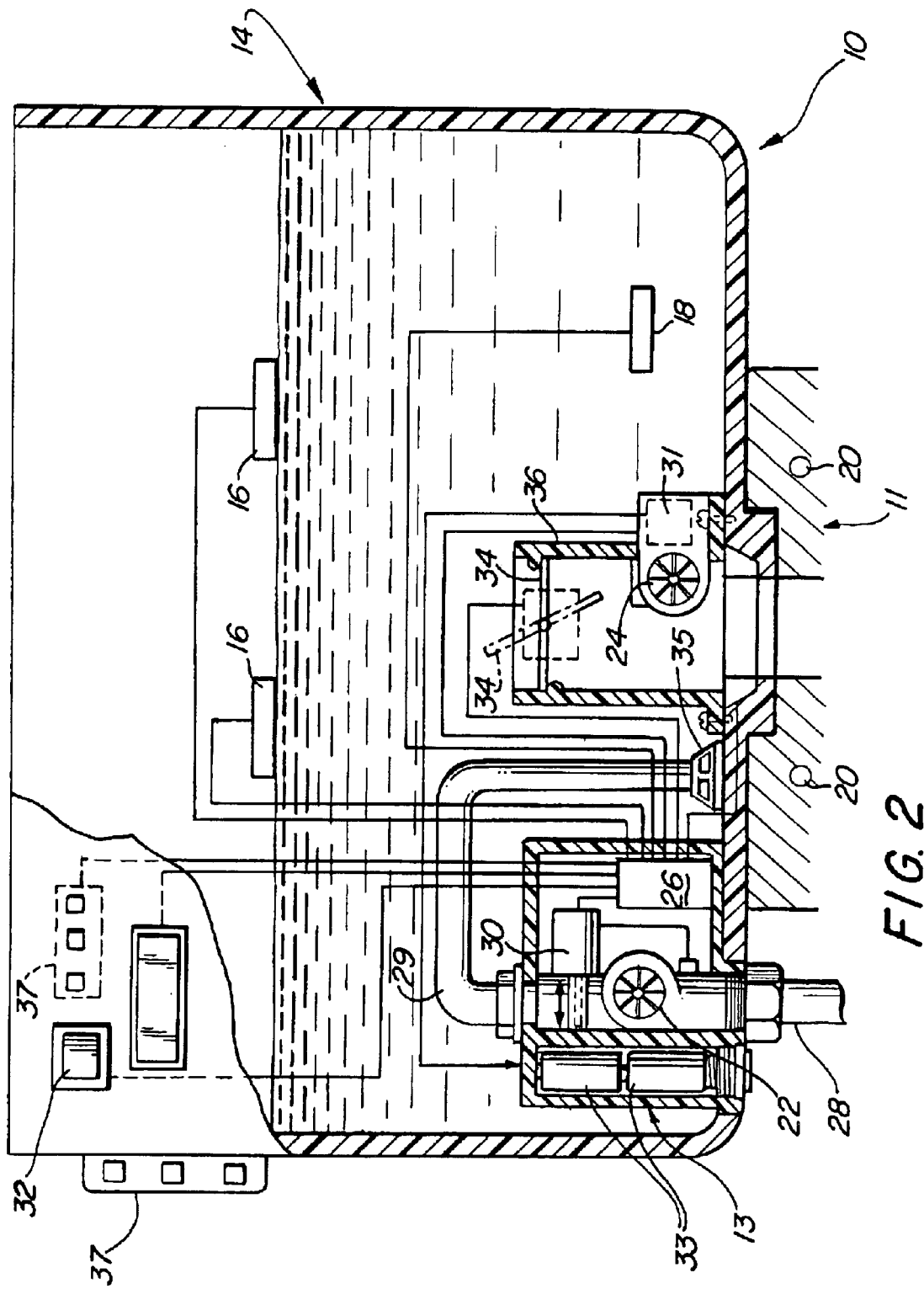
FIG. 2 is a partial cross-sectional view of a toilet having a flow control system of the present invention connected to a number of sensors mounted in a toilet bowl and/or tank and connected to the system to detect and control leaks, overflows and water levels.

As shown in FIGS. 1 and 2, the system 12 of the present invention is described as being built into a toilet 10 having a bowl 11 and a tank 14. The water measuring and flow control system 12 may take any desired form and is generally comprised of a housing 13 built into or otherwise held in the toilet tank 14. The system 12 includes or is operatively connected to a plurality of water level sensors 16, 18, 20, and one or more flow sensors 22, 24. A microprocessor control 26 is held in the housing 13 and is operatively connected to the water level sensors 16, 18, 20 and at least one, but preferably two, flow sensors 22, 24, in any known manner, such as by electric wires, infrared, microwave, RF, etc. The water level sensors 16, 18 are preferably high and low level water indicators/sensors that may be selectively mounted any place in the toilet tank 14, but are preferably formed or held in or on an internal wall. The one or more water level sensors 20 are preferably inserted and held in a toilet bowl, as by means of a clip or adhesive, or integrally formed in or to a rim of the toilet bowl or urinal 11, or in a toilet seat on the toilet bowl, to detect and prevent overflows.

The housing 13 is preferably connected directly to a waterline 28 feeding into the housing 13 and into the tank 14 via any known means, or as illustrated, by an L-shaped line 29 ending in a flange 35 for a smooth exit of water into the bottom of the tank. The housing 13 includes an operating system controlled by the microprocessor 26. A first of the flow sensors 22 is connected to, or preferably held in the housing 13, so that water entering the tank 14 must pass through or by it. This flow sensor 22 is operatively connected to the microprocessor 26 and a normally closed inlet flow control valve 30, such as a rotatable ball or solenoid operated valve, to measure and control the flow of water through the system 12 and into the toilet tank 14.

The flow sensors 22, 24 may take any desired form, such as electrically, mechanically, or sound operated devices. However, in a currently preferred embodiment of the invention the flow sensors 22, 24 are paddle wheels or turbines, rotated by flow of water from waterline 28 into the tank 14 and out through an outlet control valve 34, for example, upon actuation of a flush valve operator 32. Either or both flow sensors 22, 24 are preferably connected to generators or other charging means 31 in order to recharge a power system, such as one or more batteries 33 held in the housing 13 and/or on the exterior of the tank 14. The power system may also include an A.C. plug for insertion into a power outlet.

The flush valve operator 32 held in the toilet tank 14 is preferably a push button operatively connected to the microprocessor 26 to flush the toilet by opening the outlet control valve 34, as by means of a solenoid 35. However, it is to be understood that any other type of automatic flushing device could be used, such as an electric eye, a motion detector, or the like.

The outlet flow control valve 34 is preferably held in a separate body means, element housing 36 that is screwed into or otherwise held over an outlet opening, in place of the normal overflow pipe and flapper system found in most toilets. The body or housing 36 is preferably of a predetermined height and otherwise sized and dimensioned to fit into a specific sized tank 14 and only allow a predetermined amount of water, for example, from 1.6 gpf to 3.0 gpf, to exit the toilet tank into the bowl or urinal 13 upon actuating the flushing mechanism.

The outlet valve 34 is moved from a closed position as shown in solid line to an open position shown in phantom line in FIG. 2. The control valve 34 may be of any desired type, but is preferably a butterfly-type valve to control flow of water through the housing 36 and into the toilet bowl or urinal 11, upon flushing of the toilet.

The housing 13 may be operatively connected to a display 38 on the front of the tank 14 and may be associated with or include one or more indicator lights or alarms 37, and/or touch screen icons or buttons, such as a reset button, a silence button, a code button to enable an authorized user to enter an authorization code to reactivate the system if it becomes closed or deactivated, and/or test buttons and/or other features, as needed.

The operation of the system 12 of the present invention will now be described. The system is designed to accurately measure and control the flow of water to a toilet tank and shut off flow of water to any toilet tank and/or toilet bowl or urinal if a leak or an overflow condition is detected. As explained, the system 12 includes a controller or microprocessor 26 in the housing 13 to control operation of the system and the toilet 10.

As shown in FIG. 2, the housing 13 includes the flow detection or sensor 22 held in a conduit or passageway passing through the housing by the inlet control valve 30 to control the flow of water from inlet 28 to the interior of the tank 14. The flow detectors sensors 22, 24 are sensitive enough to be actuated when water flows or leaks by the inlet valve 30, or there is any flow or leak of water from the toilet tank 14.

The toilet is flushed or operated by pushing the pushbutton 32 to open the outlet valve 34. The tank 14 is then emptied, or, preferably, only a predetermined amount of water is allowed to exit from the tank because of the height of the body 36. The outlet valve 34 is then automatically closed, in any desired manner, for example, by actuation of a solenoid 35 by the microprocessor 26, because of the passage of a pre-determined amount of time, or the flow sensor 24 measuring a predetermined amount of water exiting through the housing 36. After closure of the outlet valve 34 and/or the sensing of a low water level by the sensor 18, the inlet valve 30 is automatically opened to allow water to enter and refill the tank 14. The amount of water entering the tank 14 through the valve 30 is accurately measured by the sensor 22, for example by rotation of a paddle wheel or turbine blade. If the flow of water continues for too long a time period, i.e., exceeds a first pre-selected time limit set for a normal flush, the controller 26 will operate the inlet valve 30 to shut off the water supply to the toilet tank. The time limit may be varied or changed, as desired, for example, from about 2.5 seconds to about 6.0 seconds, depending on the water pressure and other parameters.

The rotation of the paddle wheel or turbine blade in the sensors 22, 24 also turn the charging units 31 attached to the sensors to charge the battery system 33. The sensor 24 mounted in the outlet passageway in the housing 36 also measures the water flow exiting the tank through outlet valve 34. This sensor 24 can also detect any leaks by the outlet valve 34 when it is closed, and advises the microprocessor thereof.

That is, if there is any flow of water into or out of the tank 14 when the inlet and outlet valves 30, 34 are closed because of wear, or any other reason, such as, for example, an open outlet valve 34, or a blocked toilet bowl exit, the system 12 will detect the same via the flow sensors 22, 24 and/or the water level sensors 16, 18, 20 and report the same to the microprocessor 26. Upon detection of any leak or potential overflow, the microprocessor 26 will show an indication of the problem on display 38, or LEDs 37, and take any other programmed action, such as attempt to stop the flow of water to the tank 14 through waterline 28. In addition to any indication that may appear on the display 38, an alarm may sound and/or an indication or alarm may be sent to a remote location, pager, telephone, or the like. After this alarm, indication or warning, the microprocessor 26 can be programmed to require an authorization code to be entered into the system 12 to reset the same so that it may continue to properly operate.

As stated above, the system 12 may be powered by house current or by one or more rechargeable batteries 33, which rechargeable batteries may also be rechargeable by solar or light panels mounted on the exterior of the tank 14.

If a code is required and entered into the system 12 after repair and/or resetting and no further leakage is detected or the water level in the toilet tank 14 or bowl or urinal 11 falls below the level of the sensors 16, 18 or 20, the inlet valve 30 will then be operational to again allow water to flow through waterline 28 into housing 13 and into the tank via the L-shaped line 29 and the flange 35.

Figure 3:
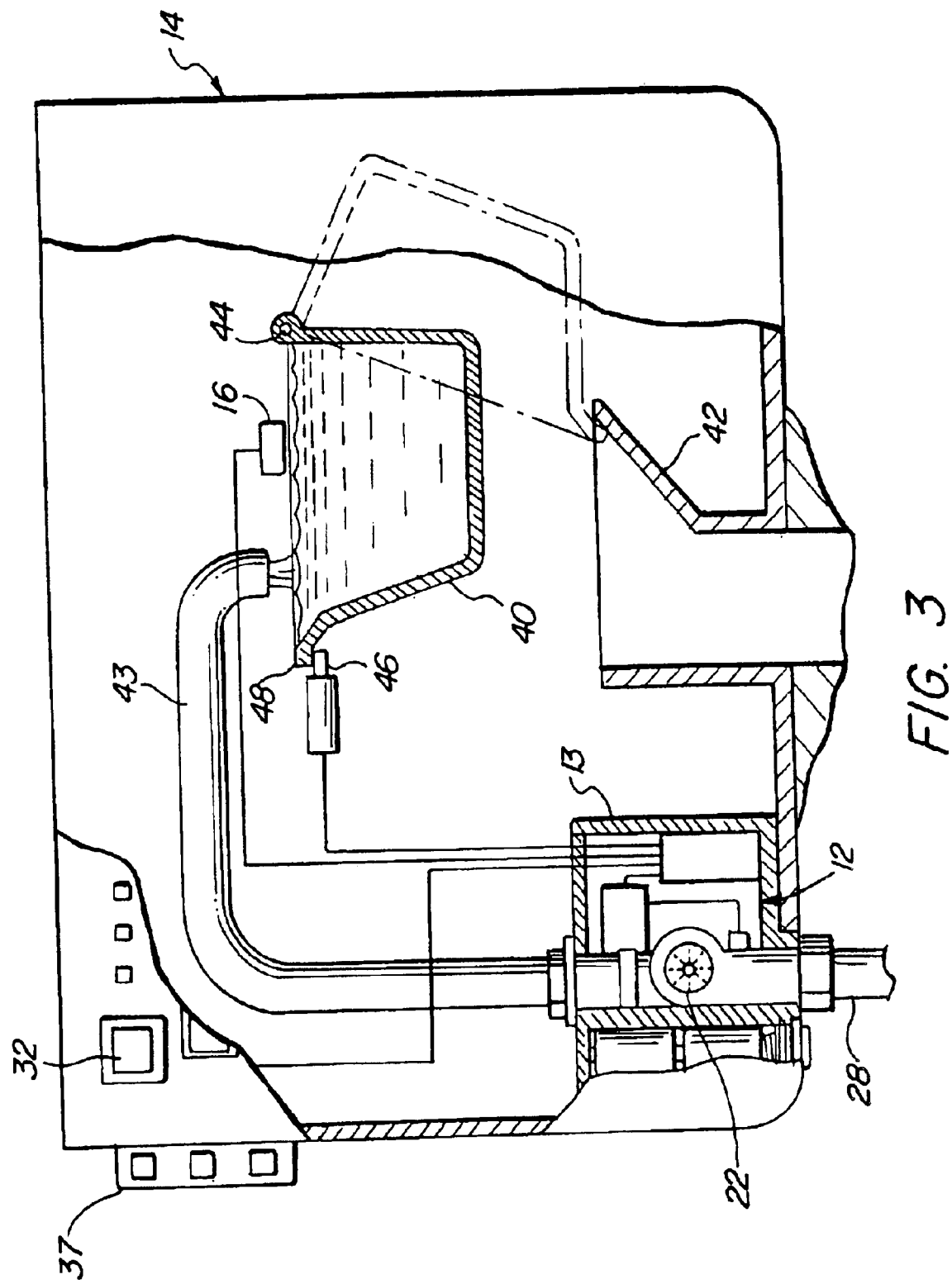
FIG. 3 is a partial cross-sectional view of a toilet tank having a flow control system of the present invention and a movable reservoir held in the tank for receiving and dispensing a predetermined amount of water through an outlet valve.

FIG. 3 shows a further embodiment of the invention in the interior of the toilet tank 14, comprised of a further water control or measuring means 40, such as a rotatable container or reservoir. This reservoir 40 cooperates with a large open mouth separate body or housing 42, which may or may not contain an outlet valve, and which replaces the body or housing 36 shown in FIG. 2. The reservoir 40 is normally biased to a raised position as shown in solid line in FIG. 3 and sized and dimensioned to fit into a specific sized tank 14 and to only hold a predetermined amount of water, for example, from 1.6 gpf to 3.0 gpf, or until the water level reaches the water level sensor 16. Water is fed into the reservoir by a further inlet line 43, which replaces the L-shaped line 29. The reservoir is hingedly or rotatably held in a predetermined position in the tank 14 on a hinge pin or the like 44. Upon actuation of the pushbutton 32 the reservoir will be lowered or released, as by means of the retraction of a solenoid actuated pin or arm 46, cooperating with a lip 48 formed on the reservoir 40, so as to move or rotate, by the weight of the water in the reservoir, from the filling position as shown in solid line, to the emptying position shown in phantom line. Water in the reservoir, will be poured into the open mouth body or housing 42 and then, either directly or through an open outlet valve, into the toilet bowl or urinal 11. After emptying the predetermined amount of water in the reservoir 40, the reservoir will automatically move back to the elevated or filling position shown in solid line, as by means of a mechanical mechanism, such as a gear or spring operated mechanism, or the like, and be locked in this position to be refilled by water entering through the housing 13, as explained above.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A control system in combination with a toilet having a toilet tank and a toilet bowl, comprising:
   a water measuring and flow control system having a housing held in the toilet tank;
   a plurality of water level sensors and overflow sensors mounted in the toilet tank and the toilet bowl;
   an operating system held in the housing; and
   a flow sensor held in the housing and operatively connected to the operating system, to an inlet control valve and to the plurality of water level sensors and the overflow sensors to measure and control water flow to and from the toilet.

2. The control system of claim 1 wherein at least one of the water level sensors is held in the toilet bowl to detect and prevent overflows from the toilet bowl.

3. The control system of claim 2, further including an outlet flow sensor mounted in an exit housing held in the toilet tank and having an outlet control valve therein; the outlet flow sensor and the outlet control valve being operatively connected to the operating system.

4. The control system of claim 3, further including a microprocessor and a power supply in the operating system.

5. The control system of claim 4 wherein at least two of the water level sensors are held in the toilet tank to measure high and low levels of water in the toilet tank.

6. The control system of claim 5, further including charging means operated by the flow sensor and the outlet flow sensor for recharging the power supply.

7. The control system of claim 1 wherein the operating system includes a microprocessor, a power supply, an inlet flow sensor and an outlet flow sensor.

8. The control system of claim 7, further including charging generators operated by the inlet flow sensor and the outlet flow sensor for recharging the power supply.

9. The control system of claim 8 wherein at least one of the water level sensors is held in the toilet bowl to detect and prevent overflows from the toilet bowl and the outlet flow sensor is mounted in an exit housing held in the toilet tank and having an outlet control valve therein; the outlet flow sensor and the outlet control valve are operatively connected to the operating system.

10. The control system of claim 1, wherein at least two of the water level sensors are held in the toilet tank to measure high and low levels of water in the toilet tank and the exit housing is sized and dimensioned to only allow a predetermined amount of water to exit from the toilet tank when the outlet valve is opened.

11. The control system of claim 1, further including means in the toilet tank to control the amount of water exiting from the toilet tank.

12. The control system of claim 11 wherein the means in the toilet tank to control the amount of water exiting from the toilet tank is an exit housing sized and dimensioned to only allow a predetermined amount of water to exit from the toilet tank when the outlet valve is opened.

13. The control system of claim 11 wherein the means in the toilet tank to control the amount of water exiting from the toilet tank is a separate reservoir movably held in the toilet tank and operable when the toilet is flushed.

14. A water measuring and flow control system in combination with a toilet having a tank and a bowl, comprising:
   a housing held in said toilet tank;
   a plurality of water level leak detection and prevention sensors held in the toilet tank;
   a plurality of overflow detection and prevention sensors held in the toilet tank and the toilet bowl;
   an inlet flow sensor held in said housing and operatively connected to an inlet control valve and to the plurality of water level leak detection and prevention sensors to measure and control water flow into the toilet;

an operating system held in the housing; and means held in the toilet tank to control the amount of water exiting from the toilet tank when it is flushed.

15. The control system of claim 11 wherein the means in the toilet tank to control the amount of water exiting from the toilet tank is a separate reservoir movably held in the toilet tank for receiving a predetermined amount of water and dispensing the predetermined amount of water upon flushing of the toilet.

16. The control system of claim 11 wherein at least one of the plurality of water level leak detection and prevention sensors is held in the toilet tank to control the amount of water received by the reservoir.

17. The control system of claim 11 wherein the means in the toilet tank to control the amount of water exiting from the toilet tank is an exit housing held in the toilet tank and sized and dimensioned to only allow a predetermined amount of water to exit from the toilet tank when the outlet valve is opened.

18. The control system of claim 17 wherein the operating system includes a microprocessor, a power supply, an inlet flow sensor and an outlet flow sensor; the outlet flow sensor is held in the exit housing after an outlet control valve; and the inlet flow sensor and the outlet flow sensor are connected to charging generators for recharging the power supply.

19. The control system of claim 14, further including an outlet flow sensor operatively connected to an outlet control valve and to the plurality of water level leak detection and prevention sensors to measure and control water flow out of the toilet, and wherein at least one of the water level sensors is held in the toilet bowl to detect and prevent overflows from the toilet bowl; the outlet flow sensor being mounted in an exit housing held in the toilet tank and sized and dimensioned to only allow a predetermined amount of water to exit the toilet tank upon flushing of the toilet.

20. A water measuring and flow control system in combination with a toilet having a tank and a bowl comprising:

a housing held in said toilet tank;

a plurality of water level leak detection and prevention sensors held in the toilet tank;

a plurality of overflow detection and prevention sensors held in the toilet tank and the toilet bowl;

an inlet flow sensor held in said housing and operatively connected to an inlet control valve;

an outlet flow sensor operatively connected to an outlet control valve;

an operating system held in the housing and connected to a power supply; the operating system including a microprocessor and operatively connected to the inlet flow sensor and the outlet flow sensor;

charging generators operated by the inlet flow sensor and the outlet flow sensor for recharging the power supply and an element held in the toilet tank to control the amount of water exiting from the toilet tank when it is flushed.

* * * * *